United States Patent [19]

Scibbe

[11] Patent Number: 4,562,902
[45] Date of Patent: Jan. 7, 1986

[54] BRAKE SYSTEM
[75] Inventor: Harold R. Scibbe, Chardon, Ohio
[73] Assignee: Clark Equipment Company, Buchanan, Mich.
[21] Appl. No.: 148,538
[22] Filed: May 9, 1980
[51] Int. Cl.[4] ............................................. F16D 65/32
[52] U.S. Cl. ..................................... 188/72.4; 91/415; 91/416; 91/519; 188/72.3; 188/106 P; 188/366; 192/83; 192/86; 192/101; 303/6 A
[58] Field of Search .............. 188/151 A, 72.4, 106 P, 188/216, 366, 170, 72.3; 303/6 A, 6 R, 84 A, 84 R; 91/415, 416, 519; 192/83, 101, 86

[56] References Cited
U.S. PATENT DOCUMENTS

| 2,195,214 | 3/1940 | Jacob | 303/84 A |
| 2,502,547 | 4/1950 | Adams et al. | 91/415 X |
| 2,519,900 | 8/1950 | Geiger et al. | 91/519 X |
| 2,527,290 | 10/1950 | Anderson . | |
| 2,683,966 | 7/1954 | Tyler | 91/415 X |
| 2,823,770 | 2/1958 | Helvern . | |
| 2,928,504 | 3/1960 | Hohn et al. . | |
| 3,105,582 | 10/1963 | Ziabicki . | |
| 3,198,295 | 8/1965 | Fangman et al. . | |
| 3,202,253 | 8/1965 | Merritt et al. . | |
| 3,217,851 | 11/1965 | Mogk et al. . | |
| 3,580,368 | 5/1971 | Heck . | |
| 3,690,429 | 9/1972 | Honda . | |
| 3,724,609 | 4/1973 | Kobald | 188/106 P X |
| 3,760,912 | 9/1973 | Braun | 188/151 A X |
| 3,927,737 | 12/1975 | Prillinger et al. . | |
| 3,941,219 | 3/1976 | Myers . | |
| 3,946,837 | 3/1976 | Houser . | |
| 4,077,500 | 3/1978 | Hickman, Sr. et al. | 188/366 X |
| 4,207,969 | 6/1980 | Howell | 188/106 P X |

FOREIGN PATENT DOCUMENTS

| 451918 | 11/1927 | Fed. Rep. of Germany | 192/86 |
| 534401 | 3/1941 | United Kingdom | 91/519 |

Primary Examiner—George E. A. Halvosa
Attorney, Agent, or Firm—Watts, Hoffmann, Fisher & Heinke Co.

[57] ABSTRACT

A brake system for an off-highway vehicle which includes a fluid pressure actuated multi-disc brake and a fluid pressure control system. Engagement of the multi-disc brake is effected by a fluid operated piston having multiple effective pressure areas. Fluid pressure applied to a certain of the effective pressure areas urges the piston in a brake applying direction; fluid pressure applied to the other of the pressure areas urges the piston in a brake releasing direction. The fluid pressure control system controls the communication of pressurized fluid to the effective pressure areas to provide both the brake applying and brake releasing functions. Redundant fluid pressure circuits supply pressurized fluid to the brake applying effective pressure areas. In the event of failure, the control system is operative to interrupt fluid flow to the failed circuit.

35 Claims, 2 Drawing Figures

BRAKE SYSTEM

BACKGROUND OF THE INVENTION

The present invention relates generally to brake systems, and in particular to a brake system for a large off-highway vehicle.

Vehicle friction brake systems, and other friction systems, such as clutches, include a plurality of friction members, some of which rotate with respect to the others. Braking is obtained by the frictional engagement between the relatively rotating members. Many of these devices utilize fluid pressure actuated pistons for accomplishing the required movement in the friction components to obtain the frictional engagement. The piston or pistons generally include an effective pressure area to which fluid pressure is applied to create a force urging the piston in a brake applying direction. The prior art has suggested a variety of piston retraction mechanisms to obtain brake release.

In large off-highway vehicles, a brake system is necessary which can bear up under the severe operating conditions. The brakes on these vehicles are often subjected to extremely large braking torques and braking applications for extended periods of time. The brakes are employed not only to stop vehicle motion, but more importantly are often utilized in retarding vehicle speed when traveling downhill. The brake unit must have the capability of dissipating extremely large kinetic energies developed due to the large vehicle mass especially when the brakes are applied for extended time periods. For this and other reasons, a brake system of the multi-disc type is often chosen for this application.

A typical multi-disc brake includes a series of interleaved, non rotatable and rotatable friction plates. The rotatable plates are operatively connected to the wheel and the non-rotatable plates are coupled or "grounded" to the axle housing or other non-rotating wheel support structure. Both the rotatable and non-rotatable plates are mounted for axial movement with respect to the axle and are enclosed within a brake housing. Spline connections are generally employed to couple the plates and the brake member to which they are operatively engaged. To obtain braking in this type of brake, the interleaved plates must be compressed so that their friction surfaces engage to convert the mechanical energy associated with the rotation of the rotatable plates into heat, which is then dissipated. The stack of interleaved plates is generally compressed between a wall of the brake chamber in which it is enclosed, and a movable pressure plate. A fluid pressure operated piston or pistons generally engage the pressure plate and move it axially into abutting contact with the outermost friction disc causing subsequent engagement of all the plates To increase the heat dissipation rate of multi-disc brakes, the discs are sometimes operated in a fluid medium which flows through the brake housing, absorbing heat from the friction discs and then transfers it to a remote heat exchanger. The multi-disc brake, coupled with a cooling system, provides a brake system having an extremely large torque capacity in a relatively small package.

Some proposed systems have suggested the use of separate retraction springs coupled to the actuating piston to obtain brake release, so that when the pressurized fluid acting on the piston was terminated, the springs would force the piston to its released position. Other systems would employ separate fluid operated retraction pistons to effect the same result. Still others have suggested the utilization of a pressurized coolant fluid to effect or aid in piston release. These suggested retraction mechanisms have generally been complex and costly.

The emergency application of the vehicle brakes upon failure of the fluid pressure system has been addressed by some prior art brake systems. Suggested mechanisms have included spring biased emergency pistons normally held in a released position by a separate fluid pressure system. Upon brake failure, the emergency pressure system would deplete the pressure applied to the spring biased piston allowing it to engage the vehicle brakes. Other systems have used redundant fluid pressure operated pistons supplied with separate sources of fluid pressure. Still others would suggest the use of a redundant pneumatic pressure and hydraulic pressure operated disc brake having separate actuating pistons operated by the respective pressure sources. In many of these suggested systems, the apparatus added significant complexity to the brake housing and more importantly adversely affected the brake assembly size, making them unsuitable for many vehicle applications having brake size constraints. In those systems which would suggest the use of separate source of pressurized fluid, the control system necessary to effect reliable operation would be costly to manufacture and maintain.

SUMMARY OF THE INVENTION

The present invention provides a brake system in which the friction brakes are applied by a fluid pressure operated piston which is both actuated and released by fluid pressure under the control of the vehicle operator.

In a preferred form, the brake system includes a source of pressurized fluid and friction brake assemblies mounted within wheel assemblies and operatively connected to the wheels so that upon brake actuation, wheel rotation is retarded or stopped. Each friction brake assembly is actuated and released by an operating apparatus which includes at least one piston and an associated piston housing shaped to define a plurality of fluid pressure chambers communicating with a plurality of effective pressure areas on the piston.

In a preferred construction, a piston and associated housing are shaped to define three effective pressure areas and three fluid pressure chambers. The effective pressure areas on the piston are configured and located such that fluid pressure applied to two of the pressure chambers establishes a brake actuation force on the piston which urges the piston in the "brake applying" direction. Fluid pressure applied to the third pressure chamber acts on an effective pressure area of the piston and establishes an opposing force which urges the piston in a "brake releasing" direction.

In the preferred embodiment, the effective pressure areas on the piston are sized so that the brake application force generated by the fluid pressure on the "brake applying" pressure areas is greater than the force generated by the fluid pressure applied to the third or "brake releasing" effective pressure area. This configuration allows the friction brake to be actuated by either the concurrent application of pressurized fluid to all three effective pressure areas, or the application of pressure to only the brake applying pressure areas. Brake release is obtained by the application of fluid pressure to the brake releasing effective pressure area and the depletion or non-application of fluid pressure to the brake applying effective pressure areas.

The preferred friction brake assembly is a wet multi-disc type brake which includes a disc pack comprising a plurality of interleaved rotatable and non-rotatable friction discs disposed in a brake chamber. The rotatable friction discs are operatively coupled to the wheel by means of a splined coupling member. The non-rotatable discs are splined or "grounded" to the brake housing and, hence, the axle housing. An annular pressure plate is disposed adjacent the disc pack and mounted for axial movement with respect to it. The fluid pressure actuated piston, which is also preferably annular, is located adjacent the pressure plate and is mounted for axial movement towards and away from the plate. When the annular piston is driven in the brake application direction by fluid pressure, it abuttingly engages the pressure plate and in concerted motion, causes the pressure plate to compress the disc pack between it and the opposite brake chamber wall. The engagement of the interleaved rotatable and non rotatable discs effects wheel braking.

The disclosed brake construction provides a "high torque" capacity in a relatively small package. The construction of the operating piston simplifies the overall braking apparatus in that a separate piston retraction mechanism is not required. The actuation and release of the brake piston and the associated brake assembly is accomplished by the application of pressurized fluid to opposing effective pressure areas on the one piston.

According to a feature of the invention, the fluid control system which operates the piston, effects brake application by concurrently applying fluid pressure to all three effective pressure areas. The force established by the "brake applying" pressure areas is greater than the force established by the "brake releasing" effective pressure area and thus brake application is effected. The retraction of the piston is obtained by depleting the fluid pressure applied to the brake applying effective pressure areas while maintaining the fluid pressure on the brake releasing effective pressure area.

To accomplish this feature, the fluid pressure control system includes a check valve and a restriction or orifice arrangement in the retraction fluid circuit through which fluid pressure is supplied to the third effective pressure area. During brake application all three pressure chambers are supplied with fluid pressure by three non-communicating fluid pressure circuits. The check valve and a restricted flow passage are disposed intermediate the pressure source and the brake release chamber. The check valve is operative to allow unrestricted fluid flow from the pressure source to the brake release chamber but operates to restrict the rate of fluid flow from the chamber to the source. When the application of pressurized fluid to the three pressure chambers is terminated, the pressure in the brake applying chambers will deplete very rapidly whereas the pressure in the brake releasing chamber will deplete very slowly as the fluid pressure from the release chamber bleeds through the restricted passage.

In a more preferred embodiment, the retraction circuit additionally includes an accumulator, communicating with the retraction fluid chamber, which stores pressurized fluid during brake applicaiton. During brake release, the fluid in the accumulator also returns to the pressure source through the restriction. The added fluid in the retraction circuit serves to increase the duration of the retraction force on the piston.

The present invention then provides a brake in which application and release is obtained with a simple but effective piston and control system arrangement. Unliked prior art devices, a separate release system or mechanism, i.e., retraction springs is not required. The overall system is cost effective and reliable due to its simplicity.

According to another feature of the invention, a control valve is disclosed which, under normal operating conditions, concurrently provides pressurized fluid to the three pressure chambers in response to an operator actuated control. The control valve includes a flow control element in the form of spool member, the position of which is determined by the pressure in the "brake applying" and retraction circuits. As long as the brake circuits are operating normally, the control valve will allow the communication of pressurized fluid to all three circuits. If a failure occurs resulting in the loss of pressure in either brake applying circuit or the retraction circuit, the spool member will shift from its pressure balanced position, closing off communication between the pressure source and the failed brake circuit. It will also terminate the fluid pressure applied to the brake release circuit and will deplete any fluid pressure remaining in the circuit. Finally, it will supply fluid pressure to only the non-failed "brake applying" circuit. The control valve guarantees that pressurized fluid for brake application is available even if a failure occurs in one brake application circuit, so that vehicle motion can be arrested upon brake failure.

The disclosed control valve controls the flow of pressurized fluid to the brake actuating piston under both normal and emergency conditions. Moreover, it obviates the need for separate service and emergency fluid pressure control systems. It also obviates the need for a separate mechanical emergency system (spring operated, etc.) as suggested by some prior art devices. The simplification of the brake assembly as disclosed by the present invention is obtained without excessive cost or at the expense of reliability.

It is an object of the present invention to provide a vehicle brake system in which friction brakes are actuated and released by a fluid pressure operated piston having a plurality of effective pressure areas.

It is another object of this invention to provide a method for actuating and releasing a friction brake by a pressurized fluid acting upon a piston having a plurality of effective pressure areas.

It is a further object of this invention to provide a control valve which controls the flow of pressurized fluid to multiple chambers communicating with associated effective pressure areas on an actuating piston.

It is a further object of this invention to provide a control valve which controls the application of fluid pressure to the actuating piston under both normal and emergency braking conditions.

Further objects and advantages will be found in reading the following detailed description of a preferred embodiment made with reference to the accompanying drawings.

BRIEF DESCRIPTION OF THE DRAWINGS

In the drawings forming a part of this application.

DESCRIPTION OF A PREFERRED EMBODIMENT

Figure 1:
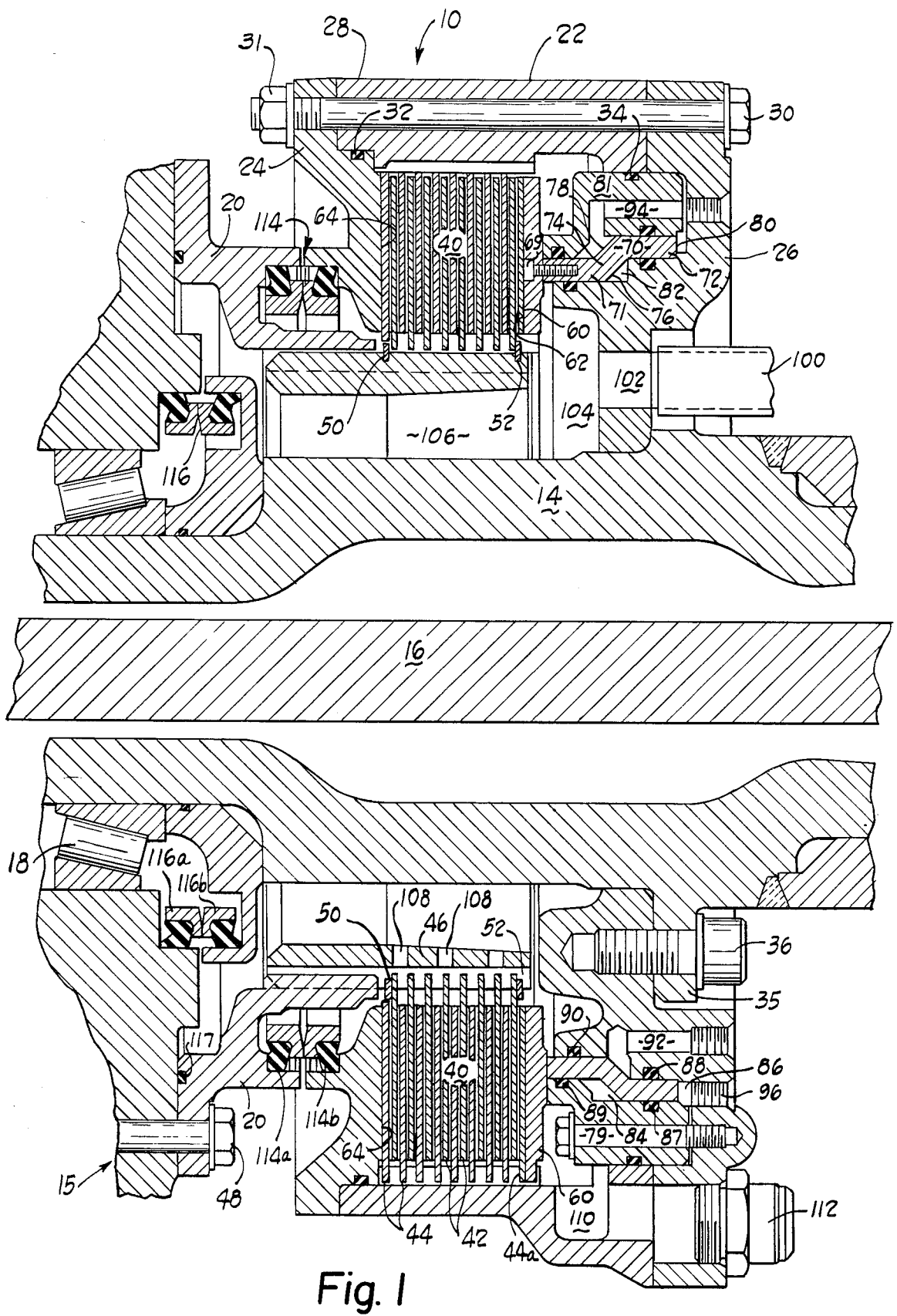
FIG. 1 is a cross-sectional view of a multi-disc brake embodying features of the present invention.
Figure 2:
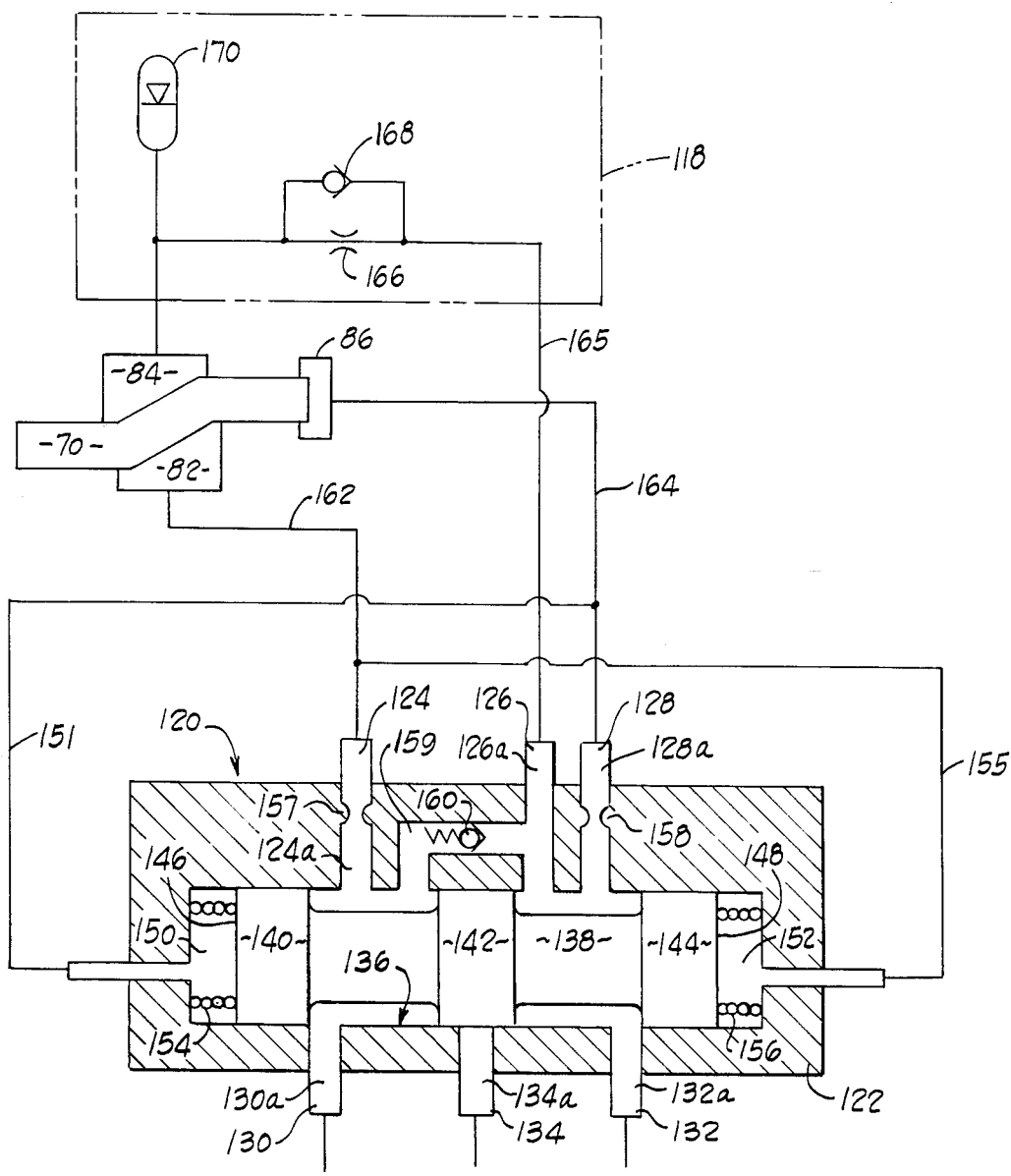
FIG. 2 is a schematic representation of the control system and brake operating piston constructed in accordance with the invention.

The brake system of the present invention includes a friction brake assembly 10 shown in FIG. 1 and a brake operating control subsystem shown in FIG. 2. The brake assembly is mounted to an axle housing 14 and is operatively engaged by a wheel hub assembly, a portion of which is indicated by the reference character 15.

The axle housing 14 is of conventional construction and surrounds a rotating axle 16. The axle 16 extends through the housing and drivingly engages an outboard final drive assembly (not shown) attached to the end of the axle housing. A wheel hub assembly 15 is rotatably supported by a pair of roller bearings, one of which is shown as 18, on the axle housing and is driven by the final drive assembly. The wheel hub 15, in turn, is coupled to the friction brake assembly 10 by a brake hub adapter 20.

The brake assembly 10 includes a brake housing 22 formed by an outboard cover 24, an inboard cover 26, and a peripheral cover 28 intermediate the covers 24, 26. The three covers are secured and clamped together by a plurality of circumferentially spaced bolts 30 and nuts 31. The interfaces between the covers are sealed to prevent fluid leakage by O-rings 32, 34. The brake assembly is secured to a flange 35, integrally formed with the axle housing, by a plurality of cap bolts 36.

The preferred friction brake is of the multi-disc variety. In accordance with this embodiment, the housing 22 encloses a brake disc pack indicated generally as 40, comprising a plurality of interleaved rotatable and non rotatable discs 42, 44, respectively. The rotatable discs 42 are faced with a friction material and are supported and engaged by a rotatable coupling or carrier 46. Mating splines on the discs and the carrier are employed to achieve an engagement which prevents relative rotational movement while allowing relative axial movement between the discs 42 and the carrier 46. The splined carrier 46 is also splined to the wheel hub adapter 20, which is bolted to the wheel hub 15 by bolts 48. Rotation of the wheel imparts rotation to the rotatable friction discs through these splined connections.

The non-rotatable discs 44 are supported and engaged by the peripheral cover 28. Again spline connections are employed to prevent rotation of the discs while allowing relative axial movement between the discs 44 and the cover 28.

The axial movement of the disc pack 40 with respect to the splined carrier 46 is constrained between predetermined limits by a pair of snap rings 50, 52. More importantly, these snap rings also prevent the splined carrier 46 from being withdrawn from the brake housing when the wheel hub 15 and attached hub adapter 20 are removed from the axle housing. Specifically, the snap ring retainers 50, 52 insure that the spline connection between the hub adapter 20 and the carrier 46 disengages and not the connection between the carrier 46 and the disc pack 40. This configuration allows the wheel to be completely removed from the axle housing without disturbing the brake assembly.

The braking torque of the brake assembly is developed whenever the disc pack 40 is compressed so that the friction surfaces of the rotatable and non-rotatable discs are engaged. To accomplish this compression, an annular pressure plate 60 is disposed adjacent to the inboard disc plate 44a, and is adapted to move axially towards and away from the disc pack 40. Movement of the annular pressure plate 60 towards the disc pack, causes the compression of the pack between an inner surface 62 of the pressure plate, and an inner surface or end wall 64 of the outboard cover 24. The pressure plate 60, like the non-rotatable discs 44, is splined to the peripheral housing cover 28 to prevent its rotation.

According to an important feature of this invention, movement of the pressure plate 60 is effected by at least one fluid pressure operated piston 70, having a plurality of effective pressure areas. The piston 70 is annular and is loosely attached to the pressure plate 60 by a plurality of circumferentially spaced fasteners 69. In the preferred form, the piston is shaped to define three effective pressure areas. As shown in FIGS. 1 and 2, the piston 70 includes two annular or cylindrical portions 71, 72 joined by a frustum portion 74. An inner surface 76 and an outer surface 78 of the frustum portion 74, and a radial end wall 80 of the annular portion 72 define three effective pressure areas on the piston. The piston 70 is mounted in a piston housing formed by the inboard cover 26 and a collar like insert 81 secured to the inboard cover 26 by a plurality of circumferentially spaced bolts 79. The assembled piston housing allows the piston 70 to move axially with respect to the friction disc pack 40 and further defines three annular fluid pressure chambers 82, 84, 86. O-rings 87, 88, 89, 90 sealably engage the piston 70 and prevent fluid leakage out of the pressure chambers 82, 84, 86.

Fluid pressure is communicated to the chambers 82, 84 by drilled L shaped passages 92, 94, respectively. A passage 96 communicates fluid pressure to the fluid chamber 86.

Pressurized fluid communicated to the "brake applying" fluid chambers 82, 86, establishes a force on the piston which urges it towards abutting engagement with the annular pressure plate 60. Pressurized fluid communicated to the retraction chamber 84 creates a force urging the piston 70 and the annular pressure plate 60 away from the disc pack 40. In a preferred brake assembly, the effective pressure areas 76, 78, 80 are approximately equal and the concurrent application of equal fluid pressure to all three areas results in a net force urging the piston 70 into engagement with and attendant movement in the annular pressure plate 60. This movement eventually causes the compression of the disc pack 40 and the development of braking torque. The depletion of fluid pressure in chambers 82, 86, coupled with the application of fluid pressure to fluid chamber 84 results in piston retraction.

To increase the heat dissipation rate of the brake assembly, coolant fluid is circulated within the brake housing 22. The coolant fluid is introduced into the housing at an inlet 100. It is then conveyed through a passage 102 to an annular distribution chamber 104 and into a brake cavity 106. The coolant fluid flows from the cavity 106 through radially directed distribution ports 108 in the carrier 46 into the disc housing. The coolant fluid then flows between and around the interleaved brake discs and finally into an annular collection chamber 110. The heated fluid leaves the brake assembly through an outlet 112 where circuits (not shown) then convey it to a remote heat exchanger (not shown). The friction discs include radial flow passages to promote coolant flow between the discs and to increase the heat dissipation rate. The direction of coolant flow is generally radial, however, axial flow is provided between adjacent discs by spaces (not shown) in the splines of the carrier 46.

A face seal 114, including a rotatable portion 114a, attached to the hub adapter 20 and a non-rotatable portion 114b attached to the housing cover 24 prevents coolant loss from the brake housing. A similar seal 116 having a rotatable portion 116a, and a non rotatable portion 116b, prevent the leakage of bearing lubricant between the rotating wheel hub 15 and the axle housing 14. A seal 117 prevents coolant fluid leakage between the hub 15 and the hub adapter 20.

In accordance with the features of the invention, the control system for the vehicle brake includes a piston retraction circuit 118 and a control valve 120 both shown schematically in FIG. 2. The control valve 120 includes a valve body 122 having output ports 124, 126, 128; input pressure ports 130, 132; a reservoir return port 134; and, an internal, cylindrically shaped cavity or bore 136. The ports communicate with the bore 136 through respective flow passages 124a, 126a, 128a, 130a, 132a, and 134a. The communication between the various ports is controlled by a flow control element 138 in the form of a spool valve, disposed within the bore 136 having three lands 140, 142 and 144.

The spool valve is pilot pressure operated and under normal operating conditions should assume the central position shown in FIG. 2. The ends of the bore 136 in cooperation with end walls 146, 148 of the lands 140, 144 respectively, define pilot pressure chambers 150, 152 which when pressurized urge the spool 138 towards the right and left, respectively, as reviewed in FIG. 2. When the pressures in the chambers 150, 152 are equal, the spool 138 remains in its central position. Balance springs 154, 156 are disposed in each pilot pressure chamber and urge the spool valve to its central position in the absence of pressure in the pilot pressure chambers. The pilot pressure chamber 150 communicates with the pressure at the output port 128 through a conduit 151 and the pilot pressure chamber 152 communicates with the pressure at the output port 124 through a conduit 155. Flow restrictions 157, 158 are disposed in the flow passages 124a and 128a respectively to increase the valves' sensitivity to failures in the control system. The flow restrictions 157, 158 will cause a larger pressure drop in the pilot pressure chambers 150, 152 for a given rate of fluid leakage in the associated fluid circuit.

The position of the spool member 138 illustrated in FIG. 2 allows the port 130 to communicate with output port 124 and input port 132 to communicate with both the output port 126 and the output port 128. A branch flow passage 159 communicates the flow passage 126a with the central bore 136 through a check valve 160. The check valve 160 operates to allow fluid flow from the flow passage 126a to the bore 136 but prevents fluid flow from the bore into flow passage 126a. The function of the flow passage 159 will be described later in greater detail.

As illustrated in FIG. 2, the output port 124 communicates with the "brake applying" fluid pressure chamber 82 through a conduit 162. The output pressure port 128 communicates with the "brake applying" fluid pressure chamber 86 through a conduit 164. The output pressure port 126 communicates with the retraction circuit 118 through a conduit 165.

The retraction circuit 118 includes a flow restriction 166, a check valve 168, and preferably a pressure accumulator 170 which is supplied with pressure whenever pressure is applied to the retraction fluid pressure chamber 84.

During normal brake operation, the movement of an operator controlled brake valve (now shown) directs equal and concurrent fluid pressure to the input ports 130, 132. The centrally positioned spool valve 138 will allow fluid pressure to flow into all three output ports 124, 126, 128. As long as equal pressures are communicated to the pilot pressure chambers 150, 152, the valve 138 will maintain its central position. Pressurized fluid will then be concurrently applied to all three fluid pressure chambers 82, 84, 86. The check valve 168 in the retraction circuit 118 will allow unrestricted fluid flow to the retraction fluid pressure chamber 84 and, hence, all three chambers will receive equal fluid pressures. Under these fluid pressure conditions, the piston 70 will be urged in a "brake applying" direction because the fluid pressure in brake applying chambers 82, 86 is applied to a total effective pressure area, much larger than the effective pressure area in the retraction chamber 84.

The brake is released whenever the flow of pressurized fluid to the input ports 130, 132 is terminated. In operation, the termination of pressure at these two ports will deplete the pressure in the brake applying pressure chambers 82, 86 very rapidly. The pressure in the retraction chamber 84 will diminish much more slowly due to the combined action of the check valve 168 and the accumulator 170. Once the pressure rise in the retraction chamber ceases, the check valve 168 will close. Stored pressurized fluid from the accumulator 170 will discharge into the retraction chamber 84 and through the restriction 166. The flow of pressurized fluid from the accumulator 170 to the retraction chamber 84 will cause the retraction force applied by fluid in the retraction chamber (and the accumulator) to be maintained for a period of time after the pressure in chambers 82, 86 has been extinguished and thus urge the piston 70 to its retracted position.

In the event of failure in any of the output circuits, the control valve 120 will operate to seal off the failed circuit and will deliver fluid pressure to the "non-failed" brake applying fluid pressure chamber so that brake application can be effected. If a failure occurs in the fluid circuit which is supplied pressure by the output pressure port 124, the loss of fluid pressure in the circuit will be manifested as a loss of pilot pressure in the chamber 152, and as a result, the spool member 138 will be driven to its extreme right position by the pressure in the chamber 150. In this position, the land 140 will block communication between the input port 130 and the output port 124. The land 142 will prevent communication between the input port 132 and the retraction output port 126. Any pressure remaining in the retraction circuit will be allowed to drain through the check valve 160 and out the reservoir return port 134. Under these conditions, only the brake applying pressure chamber 86 will be supplied with pressure to effect brake application. Even under these emergency conditions, the brake applying force will be equal to that applied under normal conditions due to the absence of fluid pressure in the retraction fluid pressure chamber 84.

Should a failure occur in either the retraction circuit 118 or the circuit supplied with fluid pressure by the output port 128, the pressure in pilot chamber 150 will diminish and the spool member 138 will be driven to its extreme left position. In this position, the land 144 blocks fluid communication between the input port 132 and both the output ports 126 and 128. As in the previous case, the land 142 will allow any fluid pressure in the retraction circuit to drain out through the reservoir return port 134. Fluid pressure will be permitted to flow between the input port 130 and the output port 124 so that the "brake applying" fluid pressure chamber 82 is pressurized. The check valve 160 in the branch flow passage 159 will prevent the fluid pressure from the input port 130 from charging or pressurizing the failed circuit serviced by either output port 126 or 128.

This novel control system integrates both the piston actuation and piston retraction functions without complex and costly apparatus. The piston retraction is accomplished in a very straightforward and more importantly, a reliable manner. Moreover, the system has a built in brake circuit redundancy so that in the event of failure of either brake applying circuits, excessive fluid loss is prevented and substantial braking ability is retained.

Although the invention has been described with a certain degree of particularity, various modifications and changes can be made to it by those skilled in the art without departing from the spirit or scope of the invention as described. For instance, a brake assembly construction which includes multiple fluid pressure actuated pistons each having a plurality of effective pressure areas is encompassed. Another contemplated modification would be a fluid operated piston having unequal effective pressure areas to which correspondingly unequal fluid pressures are applied to effect the requisite "applying" and "releasing" force relationship.

The fluid pressure control system can be modified to provide fluid pressure to the retraction chamber at all times to essentially provide a "fluid" returned spring. Alternately, the retraction chamber can be supplied with fluid pressure whenever pressurized fluid is not applied to the "brake applying" fluid chambers.

The piston 70 can be alternately shaped so that the diameter of the cylindrical portion 71 is larger than the diameter of the cylindrical portion 72. In this configuration the outer frusto-conical surface of the frustum 74 would serve as a "brake applying" effective pressure area whereas the corresponding inner frusto-conical surface would serve as a "brake release" effective pressure area. These and other changes can be made to the brake system without departing from the spirit or scope of the invention as hereinafter claimed. What is claimed is:

1. In a friction device, an operating means comprising a piston means slidably carried in a piston housing, said piston means and housing being shaped to define a plurality of non-communicating fluid chambers, said chambers communicating with associated effective pressure areas on said piston means such that the presence of fluid pressure on certain of said areas urges the piston means in a brake application direction and the presence of fluid pressure on other of said areas urges said piston means in a brake release direction, said operating means further including a valve means operative to concurrently provide pressurized fluid from a source to all of said fluid chambers to effect brake application, said valve means including means for concurrently releasing the pressure in all of the chambers and for delaying the return flow of fluid from the chambers communicating with the other effective pressure areas until the pressure in the fluid chambers communicating with the certain of said effective pressure areas is substantially reduced, to obtain brake release.

2. A brake system for a wheeled vehicle comprising:
 (a) source of pressurized fluid;
 (b) friction brake means connected to at least one wheel of the vehicle;
 (c) a brake operating means including:
  (i) a piston and an associated piston housing shaped to define three fluid pressure chambers communicating with associated effective pressure areas on the piston, said chambers and areas configured such that fluid pressure applied to the first and second pressure chambers establishes a first force tending to urge said piston in a brake application direction and fluid pressure applied to the third pressure chamber establishes a second force tending to urge said piston in a brake release direction said first force being greater than said second force;
  (ii) valve means for controlling the flow of pressurized fluid to said fluid chambers, said valve means operative to concurrently provide pressurized fluid from said source to said three fluid chambers to effect brake actuation, said valve means being further operative to concurrently terminate the provision of pressurized fluid to the three chambers and to deplete fluid pressure in said first and second fluid chambers while maintaining pressure in said third fluid chamber long enough to effect release of said brake means;
  (iii) fluid conduits communicating said valve means with said brake means.

3. The brake system of claim 2 wherein said piston includes a first cylindrical portion, a second cylindrical portion and a frusto-conical portion joining the first and second cylindrical portions.

4. In a disc brake, an actuating means comprising:
 (a) a source of pressurized fluid;
 (b) an annular piston including a first cylindrical portion, a second cylindrical portion and a frusto-conical portion intermediate said cylindrical portions;
 (c) a housing slidably supporting said piston;
 (d) the piston including three effective pressure areas, a first of the areas being defined by said housing and an inner frusto-conical surface, a second of the areas being defined by said housing and a radial wall end of said second cylindrical piston portion, and a third of the areas being defined by the housing and an outer frusto-conical surface; and,
 (e) valve means for controlling the flow of pressurized fluid to said pressure areas, said valve means concurrently providing fluid pressure from said source to all three areas to effect brake application and depleting fluid pressure to said three areas while maintaining pressure on said third area for a sufficient time to effect brake release.

5. The actuating means of claim 4 wherein said pressure on said third area is maintained by a flow restriction and a fluid pressure accumulating means.

6. A vehicle brake system comprising:
 (a) a source of pressurized fluid;
 (b) friction brake means connected to at least one wheel;
 (c) fluid pressure actuated piston means for operating said friction brake means, the piston means having three effective pressure areas configured such that fluid pressure applied to first and second of the areas tends to urge said piston means in a brake application direction and fluid pressure applied to a third of the areas tends to urge said piston means in a brake release direction;

(d) a piston housing structure slidably supporting said piston means and defining three fluid chambers each communicating with an associated effective pressure area on said piston means;

(e) three fluid pressure circuits for supplying fluid pressure to said fluid chambers, the first and second circuits being redundant brake application circuits communicating with first and second pressure chambers and the third circuit being a brake release circuit communicating with the third fluid pressure chamber; and, (f) valve means for controlling the flow of fluid pressure to said circuits, said valve means being responsive to a brake application control and concurrently providing fluid pressure to all fluid pressure circuits to effect brake application and depleting fluid pressure in said three fluid pressure circuits while maintaining fluid pressure in said third fluid pressure circuit for a sufficient time to effect brake release, and said valve means being further operative in the event of failure in one of the brake application circuits to deplete fluid pressure in the third pressure circuit and provide fluid pressure to the other brake application circuit to effect brake application.

7. In a fluid pressure operated brake system having a source of pressurized fluid, redundant brake application circuits, and a brake release circuit, a valve means for controling the flow of pressurized fluid in said circuits comprising:

(a) a valve body having a plurality of ports including two non-communicating brake application circuit input ports, two non communicating brake application circuit output ports, a reservoir port, and a brake release circuit port;

(b) pilot pressure chambers communicating with the fluid pressure in said brake application circuit output ports; and (c) a valve member moveably carried within said body for controlling the communications among the ports, the position of the valve member being responsive to the fluid pressures in said pilot pressure chambers, such that under normal brake application conditions said valve member communicates each brake application circuit input port with an associated brake application circuit output port and concurrently communicates at least one brake application circuit input port with the brake release circuit port, and in the event of failure in one of said brake application circuits, said valve member will respond to the loss of pressure in one of said pilot pressure chambers and position itself to interrupt flow between the brake application circuit input port and the brake application circuit output port of the failed application brake circuit and will concurrently communicate the reservoir port with the brake release circuit port, thereby depleting fluid pressure in said brake release circuit.

8. An actuating mechanism for a fluid pressure operated friction device comprising:

(a) a source of pressurized fluid;

(b) a piston and housing defining fluid pressure chambers communicating with associated effective pressure areas on said piston, the presence of fluid pressure on one area tending to urge the piston in a friction application direction and the presence of fluid pressure on the other area tending to urge the piston in a release direction;

(c) the mechanism including means to cause the fluid pressure to act on said first area to apply a force to said piston of a magnitude greater than that applied by fluid pressure to the second area such that the concurrent application of fluid pressure to both areas results in a net force in the application direction; and, (d) a release means including a flow restriction and check valve arranged such that when the flow of fluid pressure to said fluid pressure chambers is substantially concurrently terminated said check valve and flow restriction cooperate to delay the discharge of fluid from the release fluid chamber, thereby obtaining friction release.

9. The apparatus of claim 8 wherein said brake release system further includes a fluid pressure accumulating means.

10. A disc brake and operating means comprising:

(a) a source of pressurized fluid;

(b) a plurality of interleaved rotating and non-rotating friction discs;

(c) a pressure plate located adjacent said discs adapted to move axially to cause abutting engagement between adjacent discs to effect braking action;

(d) a fluid pressure actuated piston for effecting movement of said pressure plate;

(e) a housing slidably supporting said piston and defining three fluid pressure chambers communicating with said piston;

(f) a brake application fluid pressure system including two effective pressure areas on said piston in fluid communication with two of said fluid chambers such that the introduction of fluid pressure to said two fluid chambers generates an application force urging said piston in a brake application direction;

(g) a brake release fluid pressure system including a third effective pressure area on said piston in communication with the third fluid chamber configured such that the introduction of fluid pressure to said third chamber generates a release force urging the piston in a brake release direction, the release force being less than the application force when pressurized fluid is applied to said fluid chambers;

(h) brake actuating means for concurrently applying pressurized fluid from said source to said three fluid pressure chambers when brake application is desired and for concurrently terminating the application of pressurized fluid when brake release is desired;

(i) said release system further including a check valve means and flow restriction means operative to maintain fluid pressure in said brake release system to effect brake release, when said actuating means terminates the application of pressurized fluid to said chambers.

11. The operating means of claim 10 wherein said piston includes a first cylindrical portion, a second cylindrical portion, and a frusto-conical portion joining the first and second cylindrical portions.

12. In a fluid pressure operated disc brake, a brake release system comprising:

(a) a source of pressurized fluid;

(b) means for applying fluid pressure on an effective pressure area of an actuating piston such that the force generated by the presence of fluid pressure urges the piston in the brake release direction said force being less than a force urging the piston in a brake application direction;

(c) control means for supplying fluid pressure to said effective pressure area when said brake application force is present; and, (d) flow restriction means and accumulator means for delaying the depletion of fluid pressure on said effective pressure area when the brake application force is extinguished and the brake release pressure is released to obtain brake release.

13. The system of claim 12 wherein said control means depletes the fluid pressure to said effective pressure area when a failure occurs in the brake application force.

14. A method for operating a frictional vehicle brake comprising the steps of:

(a) applying a fluid pressure generated brake application force to an actuating member tending to urge said member in a brake application direction and concurrently applying a fluid pressure generated release force to said actuating member tending to urge said member in a brake release direction, said application force being larger than the release force such that brake application is effected;

(b) substantially concurrently releasing the brake application and release pressures; and, (c) employing a flow restriction means to delay the return flow of the release fluid pressure in order to maintain said fluid pressure generated release force when said brake application force is substantially extinguished.

15. A brake system for a wheeled vehicle comprising:
(a) a source of pressurized fluid;
(b) friction brake means connected to at least one wheel of the vehicle;
(c) a brake operating means including:
  (i) a piston and associated piston housing shaped to define three fluid pressure chambers communicating with associated effective pressure areas on the piston, such that fluid pressure applied to one of said areas establishes a first force which urges said piston in a brake release direction and fluid pressure applied to the other of said areas establishes a second force which urges said piston in a brake application direction, the first force being less than the second force;
  (ii) valve means for controlling the flow of pressurized fluid to said fluid chambers, said valve means concurrently providing pressurized fluid from said source to said three fluid chambers when brake actuation is desired, and being further operative to concurrently terminate the provision of pressurized fluid while temporarily maintaining fluid pressure application to the one area and depleting the fluid pressure applied to the other of said areas when the release of said brake is desired; and,
  (iii) fluid conduits communicating said valve means with said brake means.

16. A disc brake and operating means comprising:
(a) source of pressurized fluid;
(b) a plurality of interleaved rotatable and non-rotatable friction discs;
(c) a housing structure surrounding said friction discs defining a chamber in which a fluid coolant is circulated;
(d) fluid pressure actuated piston located adjacent said discs and adapted to move axially to cause abutting engagement between adjacent discs to effect braking action;

(e) the housing structure slidably supporting said piston and defining three fluid pressure chambers communicating with said piston;

(f) a brake application fluid pressure system include two effective pressure areas on said piston in fluid communication with two of said fluid chambers such that the introduction of fluid pressure to said fluid chambers generates an application force urging said piston in a brake application direction; and (g) a brake release fluid pessure system including a third effective pressure area on said piston in communication with the third fluid chamber such that the introduction of fluid pressure to said third chamber generates a release force urging the piston in a brake release direction, the release force being less than the application force;

(h) brake actuation means including means for concurrently providing pressurized fluid from said source to said three fluid pressure chambers;

(i) said release system further including a check valve means and flow restriction means operative to maintain fluid pressure in said brake release system for a sufficient period of time to effect brake release when said actuation means concurrently terminates the application of pressure to said three chambers.

17. A vehicle brake system comprising:
(a) a source of pressurized fluid;
(b) a plurality of interleaved rotatable and non-rotatable friction discs operatively connected to at least one wheel of a vehicle;
(c) a pressure plate located adjacent said discs adapted to move axially to cause abutting engagement between adjacent discs to effect braking in the wheel;
(d) a fluid pressure operated annular piston for effecting movement in said pressure plate, said piston including a first cylindrical portion, a second cylindrical portion, and a frusto-conical portion intermediate the first and second cylindrical portions;
(e) a housing slidably supporting said piston for movement towards and away from said pressure plate;
(f) the piston including three effective pressure areas, a first area being defined by said housing and an inner frusto-conical surface, a second area being defined by said housing and a radial end wall of the second cylindrical piston, and a third area being defined by the housing and an outer frusto-conical surface;
(g) a fluid pressure control system for actuating said piston including redundant brake application circuits communicating with the first and second effective pressure areas on the piston, a brake release circuit communicating with the third effective pressure area, and a valve assembly for controlling the flow of pressurized fluid from said source to the brake application and brake release circuits;
(h) said valve assembly including a pilot pressure operated valve element operative to communicate fluid pressure to all three brake circuits to effect brake application during normal brake system operation and is operative in the event of failure in one of the brake circuits, to seal off the flow of pressurized fluid to the failed circuit.

18. The brake system of claim 17 wherein said brake release circuit includes a flow restriction and fluid pressure accumulating means for extending the duration of fluid pressure application to the third effective pressure area.

19. In a fluid pressure operated disc brake, a brake release system comprising:
  (a) a source of pressurized fluid;
  (b) means for applying fluid pressure on an effective pressure area of an actuating piston such that the force generated by the presence of fluid pressure urges the piston in the brake release direction said force being less than a force urging the piston in a brake application direction;
  (c) control means for supplying fluid pressure to said effective pressure area when said brake application force is present; and,
  (d) flow restriction means responsive to termination of said brake application force, for delaying the depletion of fluid pressure on said effective pressure area when said control means ceases to supply fluid pressure to said area, whereby brake release is obtained.

20. The release system of claim 19 further including fluid pressure accumulator means communicating with said fluid pressure applied to the effective pressure area on the actuating piston.

21. A method for operating a frictional vehicle brake comprising the steps of:
  (a) applying pressurized fluid from a source to a portion of a brake actuating member to generate a brake application force tending to urge said member in a brake application direction and concurrently applying pressurized fluid from said source to another portion of said actuating member to generate a release force, less than said application force, which urges said member in a brake release direction; and,
  (b) employing a flow restriction means to delay the return flow of pressurized fluid from said other portion of said actuating member in order to maintain said release force when the application of pressurized fluid to said actuating member is substantially extinguished.

22. A vehicle brake system comprising:
  (a) a source of pressurized fluid;
  (b) friction brake means on at least one wheel;
  (c) fluid pressure actuated piston means for operating said friction brake means, the piston means having three effective pressure areas configured such that fluid pressure applied to first and second of the areas tends to urge said piston means in a brake application direction and fluid pressure applied to a third of the areas tends to urge said piston means in a brake release direction;
  (d) a piston housing structure slidably supporting said piston means and defining three fluid chambers each communicating with an associated effective pressure area on said piston means;
  (e) three fluid pressure circuits for supplying fluid pressure to said fluid chambers, the first and second circuits being redundant brake application circuits communicating with first and second fluid pressure chambers and the third circuit being a brake release circuit communicating with the third pressure chamber; and,
  (f) valve means responsive to a brake application control, operative to provide pressurized fluid from said source to all of said fluid pressure circuits to effect brake application and further operative to terminate the application of pressurized fluid to all of said fluid pressure circuits while temporarily maintaining pressure in said third fluid pressure circuit to effect brake release, and said valve means including means operative in the event of failure in one of the brake application circuits to deplete fluid pressure in the third pressure circuit and provide fluid pressure to the other brake application circuit, to effect brake application.

23. The apparatus of claim 22 wherein said fluid pressure in said third fluid pressure circuit is maintained by a flow restriction and check valve which cooperate to delay the return flow of pressurized fluid from said third fluid chamber until the pressure in the first and second chambers is substantially depleted.

24. In a friction system of the disc type an actuating mechanism comprising:
  (a) a source of hydraulic pressure;
  (b) an actuation and release piston for applying and releasing friction application forces in response to the supply and release of hydraulic pressure from the source;
  (c) a housing structure slidably supporting the piston;
  (d) said piston comprising:
    (i) an annular body having interconnected sections;
    (ii) a first of the sections being one of a pair of end section and being defined by radially spaced inner and outer cylindrically contoured surfaces and an annular end surface interconnecting the cylindrical surfaces, the end surface being adapted to receive friction applying hydraulic pressure and function as a first friction application effective area, the first section cylindrical surfaces each being in slidable engagement with cooperating surfaces of the housing structure in hydraulic pressure sealing relationship;
    (iii) a second of the sections being an intermediate section interconnecting the end sections, the second section having inner and outer frusto conically shaped surfaces respectively connected to the inner and outer cylindrical surfaces of the first section, the outer second section surface being adapted to receive friction applying hydraulic pressure and function as a second friction application effective area, the inner second section surface being adapted to receive friction releasing hydraulic pressure and to function as a friction release effective area, the release effective area being smaller than the combined friction application effective areas so that pressure induced friction release forces are less than the combined friction applying forces; and,
    (iv) the other of the pair of end sections being a third section, the third section having radially spaced inner and outer cylindrically contoured surfaces, the third section inner and outer surfaces respectively being connected to the intermediate section inner and outer surfaces, the third section inner and outer surfaces each slidably engaging other cooperating housing structure surfaces in hydraulic pressure sealing relationship, the third section also having an annular end surface connected to a pressure plate to transfer hydraulically induced friction application forces to a set of friction discs; and, (e) valve means for controlling the flow of pressurized fluid from said source to said effective areas, said valve means providing fluid pressure from said source to all three areas to effect brake application and concurrently depleting fluid pressure to said three areas while maintaining pressure on said third area for a sufficient time to effect brake release.

25. The system of claim 24 wherein the first piston section is of a diameter larger then the third piston section.

26. For use in a fluid actuated friction system an actuation and release piston for applying and releasing application forces in response to the supply and release of fluid pressure comprising:
(a) an annular unitary body having interconnected sections;
(b) a first of the sections being one of a pair of end sections and being defined by radially spaced inner and outer cylindrically contoured surfaces and an annular end surface interconnecting the cylindrical surfaces, the end surface being adapted to receive friction applying fluid pressure and function as a first friction application effective area, the first section cylindrical surfaces each being adapted to slidably engage cooperating housing structure surfaces in fluid pressure sealing relationship;
(c) second of the sections being an intermediate section interconnecting the end sections, the second section having inner and outer frusto conically shaped surfaces respectively connected to the inner and outer cylindrical surfaces of the first section, the outer second section surface being adapted to receive friction applying fluid pressure and function as a second friction application effective area, the inner second section surfae being adaptedto receive friction releasing fluid pressure and to function as a friction release effective area, the release effective area being less than the combined brake applying brake application effective areas; and,
(d) the outer of the pair of end sections being a third section, the third section having radially spaced inner and outer cylindrically contoured surfaces, the third section inner and outer surfaces respectively being connected to the intermediate section inner and outer surfaces, the third section inner and outer surfaces each being adapted to slidably engage the other cooperating housing structure surfaces in fluid pressure sealing relationship, the third section also having an end surface adapted to cooperate with a friction element to transfer fluid induced application forces.

27. The piston of claim 26 wherein the first piston section is of a diameter larger than the third piston section.

28. For use in an hydraulic brake system of the disc type a brake actuation and release piston for applying and releasing brake application forces in response to the supply and release of hydraulic pressure comprising:
(a) an annular unitary body having interconnected sections;
(b) first of the sections being one of a pair of end sections and being defined by radially spaced inner and outer concentric cylindrically contoured surfaces and a radially disposed annular and planar end surface interconnecting the cylindrical surfaces, the end surface being adapted to receive brake applying hydraulic pressure and function as a first brake application effective area, the first section cylindrical surfaces each being adapted to slidably engage cooperating housing structure surfaces in hydraulic pressure sealing relationship;
(c) a second of the sections being an intermediate section interconnecting the end sections, the second section having inner and outer frusto conically shaped surfaces respectively interconnecting with the inner and outer cylindrical surfaces of the first section, the outer second section surface being adapted to receive brake applying hydraulic pressure and function as a second brake application effective area, the inner second section surface being adapted to receive brake releasing hydraulic pressure and to function as a brake release effective area, the second section surfaces being concentric so that the radial vectors of applied hydraulic application and hydraulic release pressures are offsetting, the axial vector of applied brake release pressure being less then the axial force of the combined brake applying forces on the first and second brake application effective areas; and,
(d) the other of the pair of end sections being a third section, the third section having radially spaced inner and outer concentric and cylindrically contoured surfaces, the third section inner and outer surfaces respectively interconnecting with the intermediate section inner and outer surfaces, the third section inner and outer surfaces each being adapted to slidably engage other cooperating housing structure surfaces in hydraulic pressure sealing relationship, the third section also having a radially disposed annular and planar end surface adapted to be connected to a pressure plate or the like to transfer hydraulically induced brake application forces to a set of brake discs or the like.

29. The piston of claim 28 wherein the first piston section is of a diameter larger than the third piston section.

30. A method of operating a friction device selectively to permit and prevent relative rotation of a pair of sets of interleaved friction discs comprising:
(a) concurrently supplying fluid pressure to produce a disc release force and a greater disc engage force to urge the disc sets into fictional engagement and inhibit relative disc rotation;
(b) terminating the fluid pressure supply and thereby reducing the disc engage and disc release forces in a predetermined relationship such that the release force is made greater than any remaining engage force for a time sufficient to permit disc set disengagement and uninhibited relative rotation to resume; and,
(c) maintaining the termination of fluid pressure for so long as it is desired to permit relative disc set rotation.

31. The method of claim 30 wherein the supply of fluid pressure to produce engage and release forces is concurrently terminated and a constriction in the release supply produces said predetermined relationship.

32. The method of claim 30 wherein the supply of fluid pressure to produce engage and release forces is concurrently terminated and a check valve and constriction arrangement in the release supply produces said predetermined relationship.

33. In a friction device the improvement comprising:
(a) a pair of sets of interleaved friction discs;

(b) a fluid pressure actuated piston adapted to selectively apply pressure to the disc sets to permit and prevent relative rotation of the sets;

(c) a fluid supply for concurrently supplying fluid pressure to a plurality of piston effective areas to produce a disc release force and a greater disc engage force to urge the disc sets into fictional engagement and inhibit relative disc rotation; and, (d) flow control means for selectively termiating the fluid pressure supply to reduce the disc engage and disc release forces in a predetermined relationship such that the release force is made greater than any remaining engage force for a time sufficient to permit disc set disengagement and uninhibited relative rotation to resume and for maintaining the termination of fluid pressure for so long as it is desired to permit relative disc set rotation.

34. The system of claim 33 wherein the flow control means includes a constriction in the release supply to produce said predetermined relationship.

35. The system of claim 33 wherein the flow control means includes a check valve and constriction arrangement in the release supply to produce said predetermined relationship.

* * * * *